Feb. 12, 1935.  S. ROSE  1,990,712
COMBINED BIRD FOOD CONTAINER COVER AND TRAY
Filed April 15, 1933
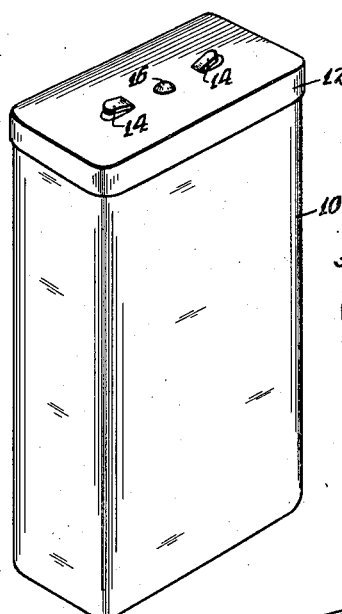
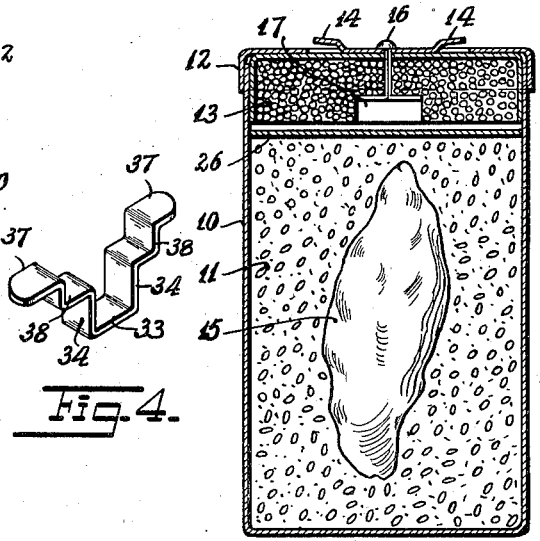
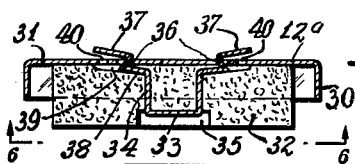
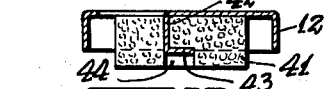
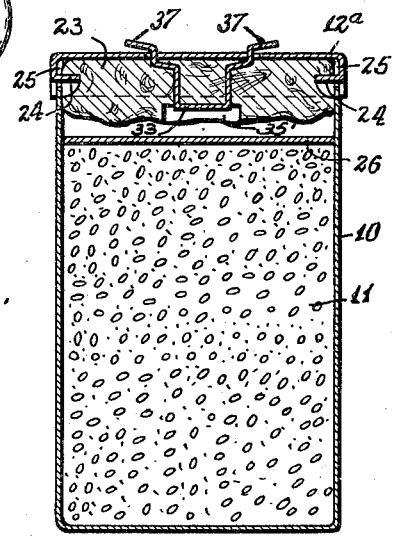
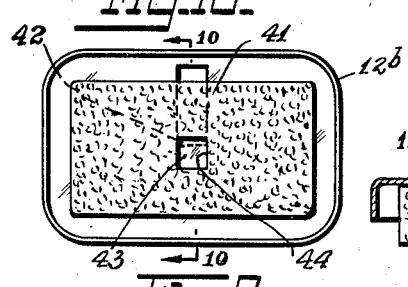
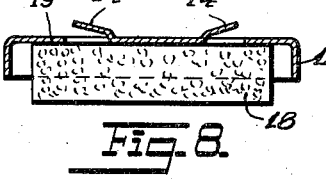
INVENTOR
SHEILA ROSE
BY
ATTORNEY Patented Feb. 12, 1935

1,990,712

UNITED STATES PATENT OFFICE 1,990,712

COMBINED BIRD FOOD CONTAINER COVER AND TRAY

Sheila Rose, New York, N. Y.

Application April 15, 1933, Serial No. 666,249

4 Claims. (Cl. 206—47)

This invention relates to new and useful improvements in a combination bird food container and food tray.

The invention has for an object the construction of an article as mentioned which is characterized by a container for holding seed and opened at the top, a cover for closing the container and supporting a bird food biscuit, and said cover constituting a food tray for the biscuit.

Still further the invention contemplates the provision of means upon the cover which will allow the attachment on a bird cage.

As another object of this invention, it is proposed to arrange the cover and bird food biscuit in such a manner that they may be connected in various ways.

Still further the invention contemplates an arrangement whereby bird necessities, such as a treated cuttlebone may be supported by the cover in lieu of the food biscuit.

Still further the invention contemplates an arrangement whereby the cover is provided with a pair of cage engaging prongs and an arrangement whereby the prongs may be depressed for insuring proper clamping of the cover upon the cage.

Another one of the objects of this invention is the construction of an article as mentioned which is simple and durable and which may be manufactured and sold at a reasonable cost.

Another one of the objects of this invention is the construction of the cover, wherein a support member is used for holding a bird seed biscuit against the inner side of the end wall of the cover and having its ends projecting through the cover and simultaneously acting as prongs by which the cover may be mounted upon the wires of a bird cage.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of a food container constructed according to this invention.

Fig. 2 is a transverse sectional view of Fig. 1.

Fig. 3 is a vertical sectional view of a cover with a bird seed biscuit, constructed according to a modification of this invention.

Fig. 4 is a perspective view of the support member used for holding the biscuit upon the cover.

Fig. 5 is a plan view of a food container similar to the one illustrated in Figs. 1 and 2 but disclosing a modified construction.

Fig. 6 is a fragmentary enlarged sectional view taken on the line 6—6 of Fig. 5.

Fig. 7 is a vertical sectional view similar to Fig. 2 but illustrating another embodiment of the invention.

Fig. 8 is a longitudinal vertical sectional view of a cover for the food container but constructed according to another embodiment of the invention.

Fig. 9 is a bottom view of another modified form of cover.

Fig. 10 is a transverse vertical sectional view taken on the line 10—10 of Fig. 9.

The combination bird food container and food tray comprises a container 10 for holding seed 11 and opened at the top. A cover 12 is engaged upon the top of the container for closing it. A bird food biscuit 13 is attached upon the bottom side of the end of the cover 12 and extends into the container when the cover is in place. The cover 12 serves a food tray when removed from the container and a provision is made for its attachment upon a bird cage. This provision comprises a pair of prongs 14 stamped from the end of the cover and directed away from each other. These prongs are adapted to engage and clamp upon the wires of the bird cage.

A treated cuttlebone 15 is disposed within the seed 11. Such cuttlebones are generally placed within the cage of the canary so that the bird may peck the bone to sharpen its bill. The container may be of any shape in transverse cross section. In Figs. 1 and 2, it is shown substantially rectangular. In Fig. 5, a modified arrangement is disclosed in which the container is substantially of elliptical shape except for the fact that the sides are straight.

In Fig. 2, the bird food biscuit 13 is shown attached upon the end of the cover 12 by reason of a pin 16 which engages through the cover and through the bird seed biscuit. The biscuit is formed with a recess 17 in which the end of the pin is disposed. The pin is formed with a slit in its end so that the sections thereof may be and are bent in opposite directions to hold the bird food biscuit in place.

In Fig. 8, a modified construction has been disclosed in which a bird seed biscuit 18 is shown attached upon the cover 12 by an adhesive 19 between the adjacent faces of the biscuit and the inside of the end of the cover. In other respects, the arrangement illustrated is similar to the showing in Fig. 2, in that when the cover is engaged in place upon the container, the biscuit is disposed within the container. The cover 12 may be used as a tray for the biscuit when it is removed from the container and mounted within the bird cage.

In the modified form of the device illustrated in Figs. 3 and 4, a cover 12ª has been shown for engaging upon a container and having side walls 30 and an end wall 31. A bird seed biscuit 32 is disposed against the inner side of the end wall 31 for depending into the container when the cover is engaged on the container. A support member is associated with the bird seed biscuit 32 and the cover for holding the bird seed biscuit upon the cover and simultaneously comprising a means whereby the cover may be attached upon a bird cage so that the cover constitutes a tray for the bird seed biscuit. In detail, the support member comprises a strip of material having a bent center 33 and a pair of arms 34 projecting therefrom. The bent portion 33 is in intimate contact with the free face of the biscuit 32 as clearly shown in Fig. 3. The biscuit 32 is provided with a recess 35 in which the bent portion 32 engages.

The arms 34 engage through the biscuit 32 and also through a pair of openings 36 formed in the end wall of the cover. The extended ends 37 of the arms are bent away from each other constituting clamping prongs in conjunction with the outer face of the end wall of the cover, by which the cover may be attached upon a bird's cage and act as a tray for the biscuit. The support member furthermore simultaneously acts to hold the bird seed biscuit in place upon the cover.

The arms 34 are provided with intermediate offset portions 38 engaging within cavities 39 formed in the face of the biscuit which is in intimate contact with the inner side of the end wall of the cover. These offset portions provide a resilient arrangement whereby the ends 37 of the arms may be bent and engage through other openings 40 in the end wall of the cover, so that the location of the prongs may be varied to better adapt the attachment of the cover upon the cage of a bird. To adjust the position of the ends 37 of the arms or prongs, they should first be bent at substantially right angles to the end wall of the cover and then slipped through the openings 36 and thereafter engaged through the openings 40. The ends 37 should then be bent away from each other and the article is now ready for attachment upon the bird cage.

In Figs. 5 and 6, a modified arrangement of the invention has been disclosed in which provision is made for clamping the prongs 14 of a cover 12' upon the wires of the bird cage. This means comprises links 20 engaged through parallel slots 21 and 22 respectively formed upon the material of the cover immediately adjacent the prongs 14 and upon the prongs themselves. The links 20 are of dimensions so as to force the prongs downward as they are shifted along from positions in the vicinity of the bases of the prongs to the free ends. Examining Fig. 6 it should be noticed that the height of the link is smaller than the natural expanded position of the prong so that the prong is forced downwards as the link is moved towards the free end.

In Fig. 7, another modified form of the invention has been disclosed which comprises the container 10 having an opened top upon which the cover 12ª is mounted. Bird seed 11 is stored within the container and a treated cuttlebone 23 is mounted upon the inner side of the cover 12 so as to normally be disposed within the top of the container when the cover is closed. The method of mounting comprises a pair of opposed prongs 24 stamped from the material at the sides of the cover 12 and engaged into opposite ends of the cuttlebone 23. Furthermore, the upper opened end of the container 10 is formed with diametrically opposite slits 25 to accommodate the prongs 24 when the cover is in place on the container.

Furthermore the cuttlebone 23 is also held against the cover 12ª by reason of the support member illustrated in Fig. 4. The cuttlebone is formed with a recess 35' which receives the bent end 33 of the support member. The other parts of the article may be recognized by the corresponding reference numerals used in Figs. 3 and 4. In Fig. 7, the cover 12ª has only one pair of openings 35 through which the ends 37 project.

Referring to Figs. 2 and 7, it should be noticed that a cardboard piece 26 is engaged within the container 10 immediately against the seeds 11 so as to hold the seeds firmly in place. This cardboard 26 may be provided with advertising matter. It serves to hold the seeds 11 from spilling when the cover of the container is removed. Before the seeds may be used, however, it is necessary that the cardboard piece 26 be removed.

In Figs. 9 and 10, another embodiment of the invention has been disclosed in which a cover 12ᵇ is shown connected with a bird seed biscuit 41. A prong 42 is stamped in from the end wall of the cover and engages through the biscuit 41 and has its free end 43 bent at right angles and disposed within a recess 44 in the biscuit 41 to accomplish the attachment of the biscuit upon the cover. In other respects, this form of the invention is identical to that previously described.

While I have shown and described the preferred embodiment of my invention, it is to be understood that I do not limit myself to the precise construction herein disclosed and the right is reserved to all changes and modifications coming within the scope of the invetnion as defined in the appended claims.

Having thus described my invention, what I claim as new, and desire to secure by United States Letters Patent is:—

1. In a device of the class described, a cover for engaging upon a container and having side walls and an end wall, a bird seed biscuit disposed against the inner side of the end wall for depending into said container, and a support member having a bent center and a pair of arms, the bent center being in intimate contact with the free face of said seed biscuit, the arms engaging through the biscuit and through openings formed in the end wall of said cover, and the extended ends of said arms being bent away from each other for constituting clamping prongs whereby the cover may be attached upon a bird cage and simultaneously serving to hold the biscuit against displacement upon the cover.

2. In a device of the class described, a cover for engaging upon a container and having side walls and an end wall, a bird seed biscuit disposed against the inner side of the end wall for depending into said container, and a support member having a bent center and a pair of arms, the bent center being in intimate contact with the free face of said seed biscuit, the arms engaging through the biscuit and through openings formed in the end wall of said cover, and the extended ends of said arms being bent away from each other for constituting clamping prongs whereby the cover may be attached upon a bird cage and simultaneously serving to hold the biscuit against displacement upon the cover, said arms having offset intermediate portions engaging within recesses formed in the face of the biscuit which is in intimate contact with the end wall of said cover, and said cover being provided with additional openings through which the extended ends of the arms may engage.

3. In a device of the class described, a cover for engagement upon a container and having side walls and an end wall, a bird seed biscuit disposed against the inner side of the end wall for depending into said container, a support member having a bent center and a pair of arms, the bent center being in intimate contact with the free face of said seed biscuit, the arms engaging through the biscuit and through the openings formed in the end wall of said cover, and the extended ends of said arms being opposed for constituting clamping prongs whereby the cover may be attached upon a bird cage and simultaneously serving to hold the biscuit against displacement upon the cover.

4. In a device of the class described, a cover for engaging upon a container and having side walls and an end wall, a bird seed biscuit disposed against the inner side of the end wall for depending into said container, and a support member having a bent center and a pair of arms, the bent center being in intimate contact with the free face of said seed biscuit, the arms engaging through the biscuit and through openings formed in the end wall of said cover, and the extended ends of said arms being bent away from each other for constituting clamping prongs whereby the cover may be attached upon a bird cage and simultaneously serving to hold the biscuit against displacement on the cover, and said cover being provided with additional openings through which the extended ends and the arms may engage.

SHEILA ROSE.